United States Patent
Anderson et al.

(10) Patent No.: US 11,513,293 B2
(45) Date of Patent: Nov. 29, 2022

(54) SYSTEM AND METHOD FOR POSITIONING AN OPTICAL PREFORM IN A FURNACE

(71) Applicant: Corning Incorporated, Corning, NY (US)

(72) Inventors: Erling Richard Anderson, Wilmington, NC (US); Kenneth William Roberts, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 413 days.

(21) Appl. No.: 16/777,226

(22) Filed: Jan. 30, 2020

(65) Prior Publication Data
US 2020/0166706 A1    May 28, 2020

Related U.S. Application Data

(62) Division of application No. 15/657,329, filed on Jul. 24, 2017, now Pat. No. 10,591,674.
(Continued)

(51) Int. Cl.
*C03B 27/04*        (2006.01)
*C03B 29/08*        (2006.01)
(Continued)

(52) U.S. Cl.
CPC ........ *G02B 6/2835* (2013.01); *C03B 37/0146* (2013.01); *C03B 37/01486* (2013.01);
(Continued)

(58) Field of Classification Search
CPC ........ C03B 37/01486; C03B 37/02736; C03B 37/00
See application file for complete search history.

(56) References Cited

U.S. PATENT DOCUMENTS 1,213,285 A * 1/1917 Slingluff ................ C03B 15/14
414/24
3,656,925 A    4/1972 Dunlap
(Continued)

FOREIGN PATENT DOCUMENTS

CN    1341081 A    3/2002
JP    54-088325 A    7/1979
(Continued)

OTHER PUBLICATIONS

Japanese Patent Application No. 2019-504754, Office Action dated Apr. 16, 2021, 8 pages (4 pages of English Translation and 4 pages of Original Document), Japanese Patent Office.
(Continued)

*Primary Examiner* — Alison L Hindenlang
*Assistant Examiner* — Steven S Lee
(74) *Attorney, Agent, or Firm* — Robert L. Carlson

(57) ABSTRACT

A system for positioning an optical preform in a furnace is provided that includes an upper muffle and a downfeed handle assembly with a tube defining a first end and a second end, the second end extending into the upper muffle. A handle is disposed within the tube. A second end of the handle extends into the upper muffle and a seal assembly is positioned around both the tube and the handle. The first end of the handle extends through the seal assembly and a drive assembly is coupled with the downfeed handle.

5 Claims, 3 Drawing Sheets

Related U.S. Application Data

(60) Provisional application No. 62/368,581, filed on Jul. 29, 2016.

(51) Int. Cl.

| | | |
|---|---|---|
| *G05B 19/045* | (2006.01) | |
| *C03B 25/00* | (2006.01) | |
| *C03B 37/027* | (2006.01) | |
| *C03B 37/014* | (2006.01) | |
| *G02B 6/28* | (2006.01) | |
| *C03B 37/029* | (2006.01) | |
| *G02B 6/255* | (2006.01) | |
| *G02B 6/40* | (2006.01) | |
| *H05B 3/42* | (2006.01) | |
| *H05B 3/62* | (2006.01) | |

(52) U.S. Cl.
CPC ...... *C03B 37/029* (2013.01); *C03B 37/02736* (2013.01); *G02B 6/2552* (2013.01); *G02B 6/40* (2013.01); *H05B 3/42* (2013.01); *H05B 3/62* (2013.01); *C03B 2205/80* (2013.01)

(56) References Cited

U.S. PATENT DOCUMENTS

| | | | |
|---|---|---|---|
| 3,890,127 A | 6/1975 | Siegmund | |
| 4,126,436 A | 11/1978 | Bailey | |
| 5,423,898 A * | 6/1995 | Terashima | C03B 37/01486 65/427 |
| 5,513,983 A | 5/1996 | Ito et al. | |
| 5,931,984 A * | 8/1999 | Drouart | C03B 37/029 65/540 |
| 6,381,990 B1 * | 5/2002 | Ball | C03B 37/029 65/540 |
| 6,543,257 B1 | 4/2003 | Koaizawa et al. | |
| 6,945,079 B2 * | 9/2005 | Oh | C03B 37/029 65/540 |
| 7,631,519 B2 * | 12/2009 | Shiono | C03B 37/029 65/537 |
| 8,631,669 B2 | 1/2014 | Okada | |
| 2002/0095955 A1 * | 7/2002 | Ball | C03B 37/02736 65/475 |
| 2003/0044743 A1 * | 3/2003 | Bookbinder | C03B 37/0146 432/86 |
| 2005/0257571 A1 | 11/2005 | Koaizawa et al. | |
| 2006/0162390 A1 * | 7/2006 | Sarkar | C03B 37/01486 65/427 |
| 2013/0298501 A1 | 11/2013 | Nummela et al. | |
| 2015/0321945 A1 | 11/2015 | Okada | |

FOREIGN PATENT DOCUMENTS

| | | | | |
|---|---|---|---|---|
| JP | 07138040 A | | 5/1995 | |
| JP | 08188439 A | * | 7/1996 | ........ C03B 37/0253 |
| JP | 2000-044269 A | | 2/2000 | |
| JP | 2001-048565 A | | 2/2001 | |
| JP | 2004238249 A | * | 8/2004 | ....... C03B 37/02736 |
| JP | 2010-024674 A | | 2/2010 | |
| JP | 2011-084409 A | | 4/2011 | |
| JP | 2016079059 A | * | 5/2016 | |
| WO | WO-2007059336 A1 | * | 5/2007 | ....... C03B 37/01446 |

OTHER PUBLICATIONS

International Search Report and Written Opinion PCT/US2017/042040 dated Oct. 5, 2017.
Boll et al; "Large Optical Fiber Drawing Furnace Developments"; Proceedings of the 59th IWCS/IICIT; pp. 335-339; Date Unknown.
Chinese Patent Application No. 201780047040.3, Office Action dated Jun. 30, 2021, 9 pages (5 pages of English Translation and 4 pages of Original Document), Chinese Patent Office.

* cited by examiner

SYSTEM AND METHOD FOR POSITIONING AN OPTICAL PREFORM IN A FURNACE

This application is a divisional and claims the benefit of priority under 35 U.S.C. § 120 of U.S. patent application Ser. No. 15/657,329, filed on Jul. 24, 2017, now U.S. Pat. No. 10,591,647, which claims the benefit of priority under 35 U.S.C. § 119 of U.S. Provisional Application Ser. No. 62/368,581 filed on Jul. 29, 2016 the content of which is relied upon and incorporated herein by reference in its entirety.

FIELD OF THE DISCLOSURE

The present disclosure generally relates to a system for positioning an optical component, and more particularly, to a system for positioning an optical preform within a furnace.

BACKGROUND

Furnaces used in the production of optical fibers and consolidation of optical fiber preforms typically require isolated environments supplied by various sealing methodologies and employ controlled flow of one or more non-reactive or noble gases in the production of optical fibers and the consolidation of optical fiber preforms. Seals within and proximate to the furnace may be exposed to high heat, necessitating the use of hydrostatic seals or high temperature tolerant materials. Use of hydrostatic seals may allow for the uncontrolled escape of the non-reactive or noble gases from the system resulting in added cost and loss of a non-renewable resource.

SUMMARY OF THE DISCLOSURE

According to at least one aspect of the present disclosure, a system for positioning an optical preform in a furnace is provided that includes an upper muffle and a downfeed handle assembly with a tube defining a first end and a second end, the second end extending into the upper muffle. A handle is disposed within the tube. A second end of the handle extends into the upper muffle and a seal assembly is positioned around both the tube and the handle. The handle extends through the seal assembly. A drive assembly is coupled with the handle.

According to another aspect of the present disclosure, a method for positioning an optical preform in a furnace is provided that includes steps of providing a chuck interface movably coupled with a drive assembly; positioning the chuck interface within a seal assembly; coupling a handle within the chuck interface, an optical fiber preform positioned on an opposite end of the handle from the chuck interface; positioning the handle within a tube; positioning the optical fiber preform within a furnace; and moving the handle at least one of laterally and rotationally within the tube such that the optical fiber preform is moved at least one of laterally and rotationally within the furnace.

According to another aspect of the present disclosure, a system for positioning an optical preform in a furnace is provided that includes a downfeed handle with a tube defining a first end and a second end. A handle is disposed within and extends through the tube and a seal assembly extends around both the handle and the tube. The handle extends through the seal assembly. The tube terminates within the seal assembly. A chuck interface is positioned around the handle and within the seal assembly. A drive assembly has a chuck. The chuck is configured to accept the chuck interface. The drive assembly is configured to move the chuck interface within the seal assembly and the handle within the tube.

These and other features, advantages, and objects of the present disclosure will be further understood and appreciated by those skilled in the art by reference to the following specification, claims, and appended drawings.

DETAILED DESCRIPTION

Additional features and advantages of the disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
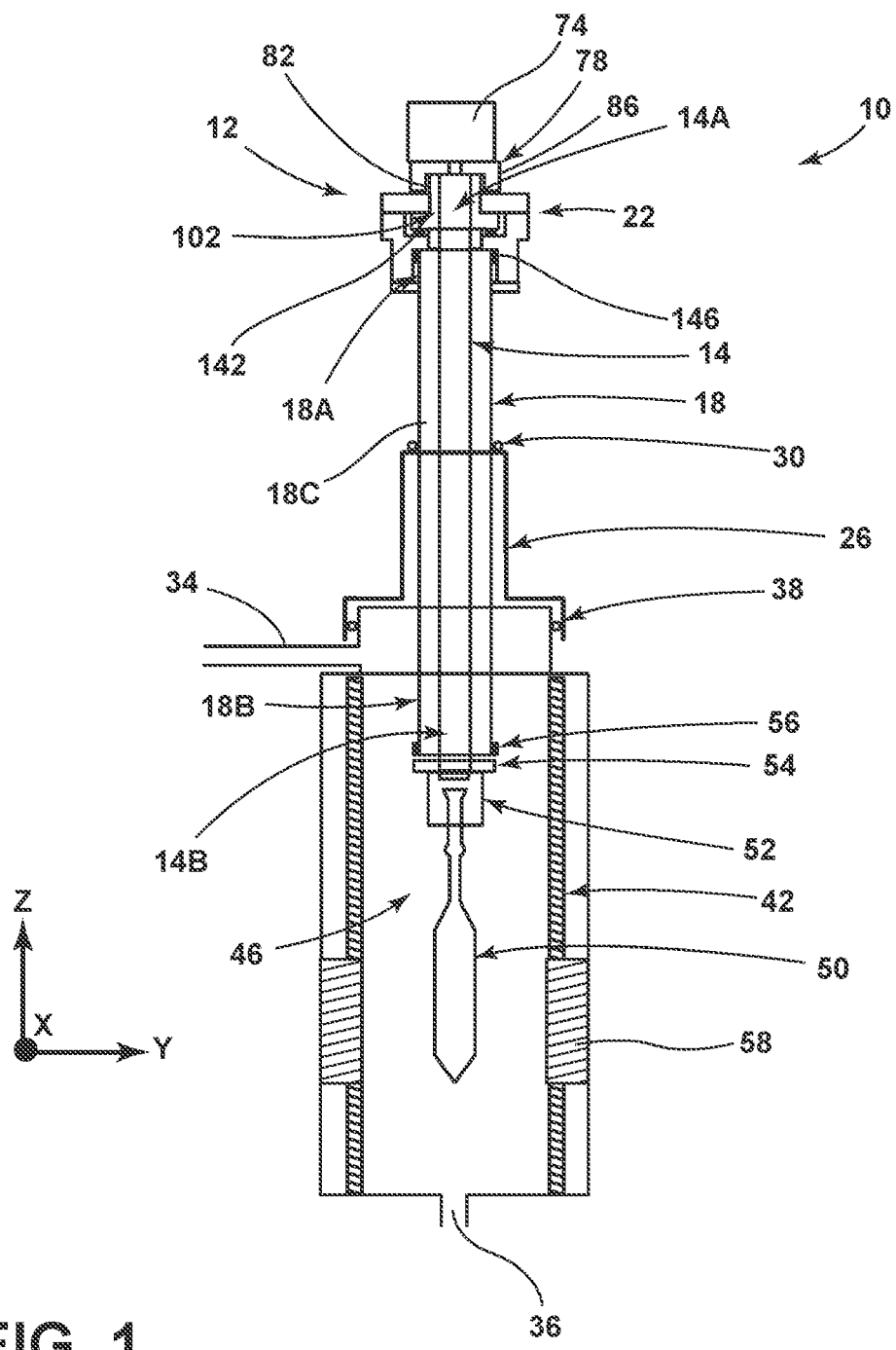
FIG. 1 depicts a schematic cross-sectional view of a preform consolidation system incorporating a seal assembly, according to one embodiment.

Referring to FIG. 1, reference numeral 10 generally designates a preform consolidation system configured to consolidate an optical fiber preform. The preform consolidation system 10 includes a downfeed handle 12 which is movable within the preform consolidation system 10. The downfeed handle 12 includes a handle 14 disposed within a tube 18. The handle 14 may include a first end 14A and a second end 14B positioned at opposite ends of the handle 14. The first end 14A is a top end and the second end 14B is a bottom end. The handle 14 may be composed of a glass, glass ceramic or ceramic material. In a specific example, the handle 14 may be composed of quartz. The tube 18 may define a first end 18A and a second end 18B. In the depicted example, the first end is a top end and the second end 18B is a bottom end. Further, the tube 18 is hollow such that an inner volume 18C is defined within the tube 18. The handle 14 passes through the inner volume 18C of the tube 18. The tube 18 has a greater internal diameter than an external diameter of the handle 14 such that the handle 14 may move horizontally within the inner volume 18C of the tube 18 independently of the tube 18. The tube 18 may be composed of a glass, glass ceramic or ceramic material. In a specific example, the outer tube 18 may be composed of quartz or silica glass, but is not limited thereto. According to various examples, the handle 14 may extend out of the first and second ends 18A, 18B of the tube 18.

The preform consolidation system 10 further includes a seal assembly 22. The seal assembly 22 is configured to minimize or prevent the uncontrolled escape of gases from within the preform consolidation system 10 and prevent gases present in an environment around the system 10 from entering the preform consolidation system 10. The seal assembly 22 is positioned around both the handle 14 and the tube 18. The handle 14 may extend fully through the seal assembly 22 and the tube 18. The tube 18 may terminate within the seal assembly 22 (i.e., the first end 18A of the tube 18 is surrounded by the seal assembly 22). As will be explained in greater detail below, use of the seal assembly 22 allows the handle 14 to be movable in a lateral, or X-Y, horizontal direction, as well as rotate about a Z-direction within the tube 18 while minimizing or preventing the escape of gases from the top of the preform consolidation system 10. An outside diameter of the handle 14 and an outside diameter of tube 18 are sized such that a desired extent of lateral motion for handle 14 relative to the tube 18 can be achieved. This difference in diameter between the handle 14 and the tube 18 is equivalent to the difference between the diameter of a preform 50 and an upper muffle 42 (e.g., less than about 0.5 inches, less than about 0.25 inches, or less than about 0.125 inches).

Positioned around the tube 18, and below the seal assembly 22, is a top hat 26. Positioned at an interface between the top hat 26 and the tube 18 is a seal 30. In one example, the seal 30 may be a lip seal. The seal 30 is configured to allow sliding motion of the tube 18 in and out of, or through, the top hat 26 in a vertical, or Z-direction, while maintaining a seal to prevent the escape of gases within the preform consolidation system 10. The seal 30 may be a radial shaft seal composed of an elastomeric material. According to one example, the seal 30 may be a spring energized plastic u-cup seal. In such an embodiment, the spring may provide the restoring force against the self-restoring aspect of elastomer materials. According to various examples, the seal 30 may exhibit a low coefficient of friction. The handle 14 and seal assembly 22 may similarly move in the vertical direction with the tube 18 such that the seal assembly 22 may move towards, or away from, the top hat 26. The top hat 26 extends over, and is positioned above, a gas passage 34. The gas passage 34 may be a single opening or a plurality of openings to allow controlled and directed flow of gas. Positioned between the top hat 26 and the gas passage 34 is a top hat seal 38. According to various examples, the top hat seal 38 may be an inflatable seal as explained in greater detail below. The top hat seal 38 is configured to prevent the interchange of gases within the preform consolidation system 10 and the environment. The top hat seal 38 may be composed of an elastomeric material within an inner gas void which may function as a bladder. As a pressure within the inner gas void is increased, the elastomeric material of the top hat seal 38 may increase in size thereby sealing the top hat 26 to the gas passage 34. The top hat seal 38 may be positioned on the gas passage 34, the upper muffle 42 or an inner surface of the top hat 26. According to various examples, the top hat 26, the gas passage 34, and/or the top hat seal 38 may include a passageway configured to pass coolant (e.g., water) such that the top hat seal 38 may not overheat.

The top gas passage 34 may be a cylindrical, double wall mechanical device with flanges at both ends for mounting that may be used to supply, for example, inert gas to a furnace portion of the preform consolidation system 10. Fluidly coupled with the gas passage 34 is an upper muffle 42. The upper muffle 42 defines an inner passageway 46 through which a fiber preform 50 may pass. The fiber preform 50 is supported by the second end 14B of the handle 14. Specifically, a fused silica glass boule 52 is coupled to the second end 14B of the handle 14 and configured to hold an end of the fiber preform 50. Positioned between the boule 52 and the handle 14 is a baffle 54. The baffle 54 may be joined to the boule 52 through a glass join seal. The baffle 54 is sized and positioned on the second end 14B of the handle 14 to resist the interchange of gases (e.g., minimize fluid communication) between the inner passageway 46 and the inner volume 18C. The baffle 54 may have a wider diameter than the tube 18. The baffle 54 may be composed of quartz. Positioned on an outer surface of the tube 18 at the second end 18B is a flange 56. The flange 56 is sized and configured to contact the top hat 26 proximate the seal 30. A gap is maintained between the top surface of the baffle 54 and the bottom of flange 56 to insure handle 14 can move relative to the tube 18. This gap may be less than about 0.125 inches, less than about 0.09375 inches, or less than about 0.0625 inches. The flange 56 may be advantageously used to hold the top hat 26 when the downfeed handle 12 is pulled away from the preform consolidation system 10 (e.g., for example when loading a new fiber preform 50 into the preform consolidation system 10). As the fiber preform 50 is lowered into the upper muffle 42, the top hat 26 will be held by the flange 56, and will set down onto the gas passage 34 at which point the downfeed handle 12 will continue lowering the fiber preform 50 into the preform consolidation system 10.

Positioned below the upper muffle 42 is a furnace 58. The furnace 58 is configured to apply heat to the fiber preform 50 such that the fiber preform 50 may be consolidated (e.g., increased in density). The furnace 58 may be heated to a temperature of about 1500° C.

Figure 2:
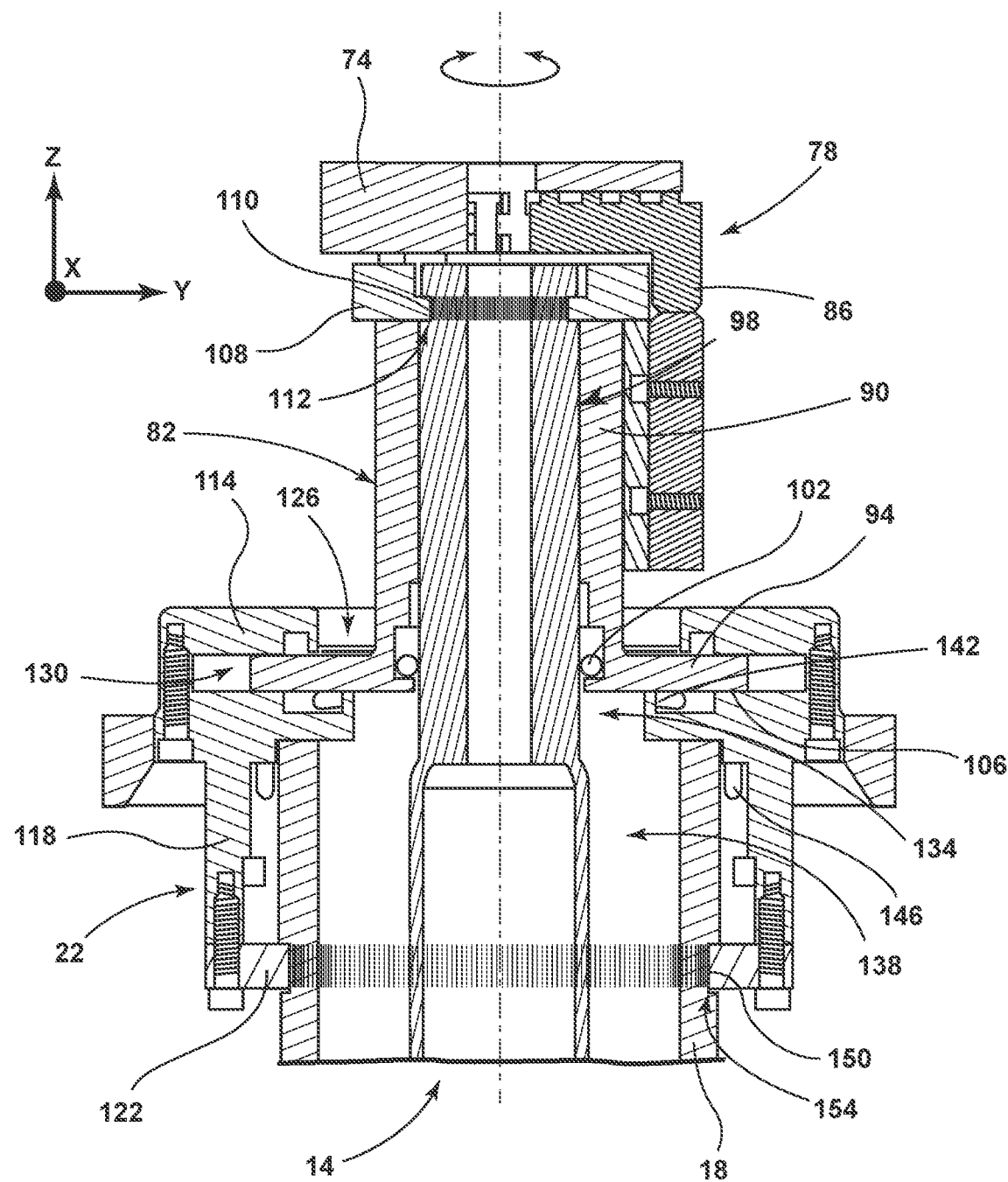
FIG. 2 depicts an enhanced view of the seal assembly of FIG. 1, according to one embodiment.

Referring now to FIG. 2, as explained above, the handle 14 extends through the seal assembly 22. Positioned above the seal assembly 22 is a drive assembly 74. The drive assembly 74 includes a chuck 78 which is coupled to the handle 14 through a chuck interface 82. The drive assembly 74 may include two linear stages, stacked vertically, and attached 90° apart. The drive assembly 74 is configured to provide movement in an X- and Y-direction (e.g., lateral movement) to the handle 14 within the tube 18 (i.e., and therefore the optical fiber preform 50 within the furnace 58). Further, the chuck 78 may be rotated via a rotational drive coupled to the two linear stages, thereby allowing the handle 14 and optical fiber preform 50 to be rotated independently of the tube 18, the seal assembly 22 and furnace 58. In rotational embodiments, the tube 18 and/or seal assembly 22 may be rotationally locked. According to various examples, the chuck 78 may include a plurality of jaws 86 configured to grip the chuck interface 82. In the depicted example, the chuck 78 includes three jaws 86 (i.e., with only one being visible in the depicted cross-sectional view) configured to grip around the chuck interface 82, but may have less than, or more than, three jaws 86. It will be understood that the chuck 78 may not include the jaws 86, but may incorporate other gripping structures (e.g., clamps, fasteners, etc.) without departing from the teachings provided herein.

The chuck interface 82 is configured to couple the drive assembly 74 and the jaws 86 to the first end 14A (FIG. 1) of the handle 14. The chuck interface 82 defines an interface body 90 and an interface flange 94. The interface body 90 is configured to be gripped by the jaws 86. The chuck interface 82 defines an aperture 98 into which the first end 14A of the handle 14 is positioned. The aperture 98 extends through the interface flange 94 and the interface body 90. An inner handle seal 102 is positioned within the aperture 98 between the interface body 90 and the handle 14. The interface flange 94 extends radially outward from the interface body 90. The interface flange 94 may extend around the interface body 90 equally (e.g., in a circular shape) or in other shapes and configurations that may be contemplated. The interface flange 94 defines a flange face 106 which is configured to couple with the seal assembly 22 as explained in greater detail below. Positioned on top of the chuck interface 82 is a handle lock 108. The handle lock 108 defines a handle flange 110 configured to engage a handle groove 112 defined by the handle 14. Engagement of the handle flange 110 with the handle groove 112 provides support to the handle 14 such that the handle 14 may move in the Z-direction with the seal assembly 22. The weight of the handle 14 is transferred to the chuck interface 82 through the handle lock 108 being positioned on top of the chuck interface 82.

The seal assembly 22 is configured to accept the chuck interface 82, the handle 14 and the tube 18 while preventing the escape of gases from within the preform consolidation system 10. The seal assembly 22 includes a top plate 114, a seal body 118 and a bottom plate 122. The top plate 114 defines a chuck aperture 126 configured to accept the chuck interface 82. The chuck aperture 126 may a have a greater diameter than the interface body 90 such that the chuck interface 82 may move within, and relative to, the seal assembly 22 in a lateral (e.g., X- and Y-) direction. Defined between the top plate 114 and the seal body 118 is a flange opening 130. The flange opening 130 is sized to accept the interface flange 94 and to allow lateral movement of the interface flange 94 (i.e., and the chuck interface 82) in a horizontal plane relative to the seal assembly 22. The seal body 118 defines a seal aperture 134 connecting the flange opening 130 and a tube opening 138. Positioned around the seal aperture 134 is a face seal 142. The face seal 142 is configured to physically contact the flange face 106. The face seal 142 and the flange face 106 are configured to provide a sealed coupling to prevent gases within the preform consolidation system 10 from escaping. The face seal 142 is configured to contact the flange face 106 such that the interface flange 94 may be moved within the seal assembly 22 while preventing gases from escaping from within the inner volume 18C of the tube 18 (i.e., and thereby the furnace 58 (FIG. 1)). Movement of the flange face 106 across the face seal 142 allows for the translational movement of the handle 14 within the tube 18. Rotational movement of the chuck 78 allows for rotational movement of the flange face 106 across the face seal 142 and concomitant rotational movement of the handle 14 within the tube 18. According to various examples, the face seal 142 may be composed of an elastomeric material. In another example, the face seal 142 may be composed of a glass filled Teflon. The face seal 142 may be of sufficiently low friction (e.g., a static coefficient of friction of between about 0.05 and about 0.2) to minimize angular deflection within the handle 14 as the handle 14 is moved within the tube 18 by the drive assembly 74. The depicted example of the downfeed handle 12 minimizes the moment load applied to the handle 14 during horizontal movement by locating the face seal 142 in close proximity to the drive assembly 74. This allows the face seal 142 to be located at a free end (e.g., the first end of handle 14 of the downfeed handle 12).

The first end 18A (FIG. 1) of the tube 18 is positioned within the tube opening 138 of the seal assembly 22. The seal assembly 22 includes a tube seal 146 disposed within the tube opening 138 between the tube 18 and the seal body 118. The tube seal 146 is configured to prevent the exchange of gases between the inner volume 18C of the tube 18 and the environment. The tube seal 146 may be composed of an elastomeric component. The bottom plate 122 defines a tube lock 150. The tube lock 150 is configured to engage a tube groove 154. Engagement of the tube lock 150 with the tube groove 154 allows the seal assembly 22 to support the tube 18 such that the tube 18 is movable in the Z-direction with the seal assembly 22.

Referring now to FIGS. 1 and 2, according to one exemplary method of operating the downfeed handle 12 within the preform consolidation system 10, the downfeed handle 12 and the top hat 26 are positioned above the upper muffle 42 and gas passage 34 in a spaced apart configuration. The top hat 26 is supported by the tube 18 at the flange 56. The fiber preform 50 is loaded into the boule 52 and then lowered into the upper muffle 42. As the fiber preform 50 is lowered into the upper muffle 42 and into the furnace 58, the top hat 26 comes to rest around the top of the gas passage 34. Positioned below the furnace 58 is a gas port 36 configured to allow gas to enter and exit the preform consolidation system 10. It will be understood that the gas passage 34 may be part of the upper muffle 42. Once the top hat 26 seats onto the top of the gas passage 34, the top hat seal 38 is inflated to seal the top hat 26 to the upper muffle 42 by pressurizing its internal void until it contacts and seals the top hat 26 to the gas passage 34. The fiber preform 50 can then be lowered further into the furnace 58, with the downfeed handle 12 sliding through the low friction seal 30. Under various circumstances, consolidation of the optical fiber preform 50 may benefit from centering (e.g., moving laterally or rotating) of the fiber preform 50 within the furnace 58. Under such circumstances, the fiber preform 50 may be moved laterally or horizontally within the furnace 58 by actuating the drive assembly 74 to move the handle 14 to which the preform 50 is supported. After the fiber preform 50 is consolidated, the downfeed handle 12 and the top hat 26 may be removed from the upper muffle 42 and the furnace 58 and a new fiber preform 50 may be attached to the boule 52 and the process restarted.

Figure 3:
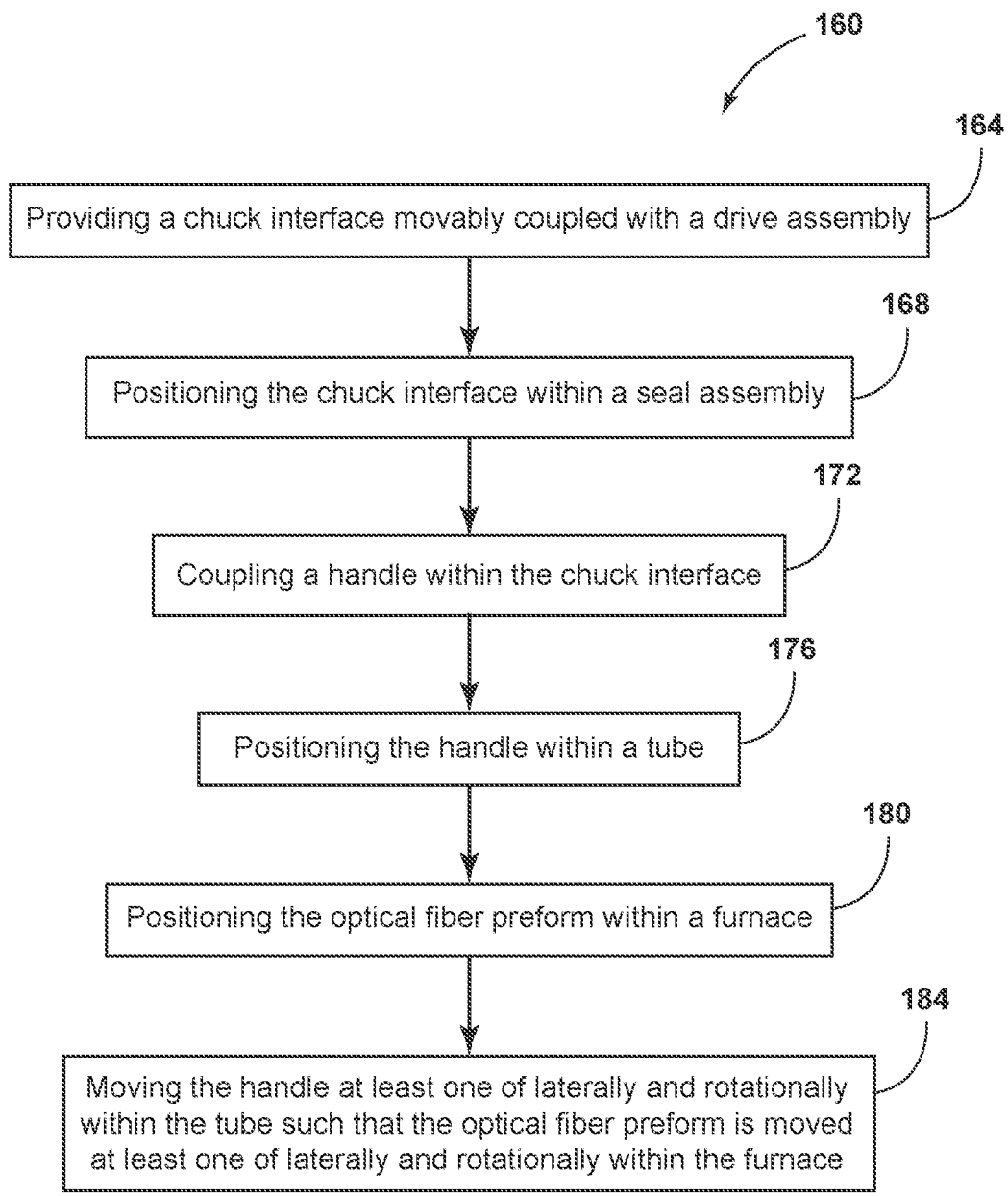
FIG. 3 depicts a method of positioning an optical fiber preform within a furnace; according to one embodiment.

Referring now to FIG. 3, depicted is a method 160 for positioning the optical fiber preform 50 in the furnace 58. The method 160 includes steps 164, 168, 172, 176, 180 and 184. First, step 164 of providing the chuck interface 82 movably coupled with the drive assembly 74 is performed. As explained above, the chuck interface 82 may be movably coupled with drive assembly 74 through the jaws 86. Next, step 168 of positioning the chuck interface 82 within the seal assembly 22 is performed. Next, step 172 of coupling the handle 14 within the chuck interface 82 is performed. As explained above, the optical fiber preform 50 may be positioned on an opposite end of the handle 14 from the chuck interface 82. Next, step 176 of positioning the handle 14 within the tube 18 is performed. Next, step 180 of positioning the optical fiber preform 50 within the furnace 58 is performed. Finally, step 184 of moving the handle 14 at least one of laterally and rotationally within the tube 18 such that the optical fiber preform 50 is moved at least one of laterally and rotationally within the furnace 58 is performed. It will be understood that although the method 160 is depicted and described in a particular order, the steps 164, 168, 172, 176, 180 and 184 may be performed in any order and with intervening steps.

Use of the preform consolidation system 10 of the present disclosure may offer several advantages. First, use of the handle 14, seal assembly 22 and the tube 18 allow X-, Y- and Z-direction positioning and rotation of fiber preform 50 within the furnace 58 to optimize heating of the preform 50. As explained above, the drive assembly 74 may provide lateral motion (e.g., in the X- and Y-directions) to the chuck interface 82 such that the handle 14 may be moved within the tube 18 and the optical fiber preform 50 within the furnace 58. In this way, centering of the fiber preform 50 within the furnace 58 can be maintained independent of the vertical position of the preform 50. Further, as explained above, the use of the drive assembly 74 with the handle 14, seal assembly 22 and the tube 18 allow rotation of the handle 14 and the optical fiber preform 50 independently of the tube 18 and the furnace 58. Rotation of the optical fiber preform 50 within the furnace 58 may be advantageous in allowing uniform heating and consolidation of the optical fiber preform 50. Second, use of the chuck interface 82, the drive assembly 74 and the seal assembly 22 allows for a low moment load to be applied to the handle 14. As the handle 14 may be composed of high temperature resistance, but low bending resistant, materials, decreasing the moment load on the handle 14 decreases the risk of cracking and failure of the handle 14. Third, by using the above provided disclosure, the seal assembly 22, including the face seal 142, the handle seal 102 and the tube seal 146, may be positioned away from the heat of the furnace 58. As the face seal 142, the handle seal 102 and the tube seal 146 are positioned away from the heat and high temperatures of the furnace 58, the seals 142, 102, 146 can use low temperature/low cost elastomer seals. As such, furnace isolation (e.g., of gases) is maintained using standard/simple seals composed of low cost materials that may not require frequent replacement. Further, the need for hydrostatic face seals (e.g., a floating plate lifted by flowing gas) may be eliminated which may aid in retention of process gases within the preform consolidation system 10. Fourth, use of the seal assembly 22 allows for the movement of the handle 14 relative to the tube 18 while minimizing the loss of process gases to the environment.

It will be understood that although the disclosure is described in connection with a preform consolidation system 10, according to another embodiment, the seal assembly 22, downfeed handle 12, handle 14, tube 18, as well as similarly constructed parts, may be utilized in a fiber draw furnace in substantially the same manner. The fiber draw furnace may be oriented vertically, similar to the preform consolidation system 10. The seal assembly 22, downfeed handle 12, handle 14, tube 18, as well as similarly constructed parts, may be utilized to prevent the escape of process gases within the fiber draw furnace in a substantially similar manner to that described in connection with the preform consolidation system 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A method for positioning an optical preform in a furnace, comprising:
   providing a chuck interface movably coupled with a drive assembly;
   positioning the chuck interface within a seal assembly;

coupling a handle within the chuck interface, an optical fiber preform positioned on an opposite end of the handle from the chuck interface;

positioning the handle within a tube;

positioning the optical fiber preform within a furnace; and moving the handle at least one of laterally and rotationally within the tube such that the optical fiber preform is moved at least one of laterally and rotationally within the furnace wherein the handle and the tube are configured to move vertically together.

2. The method of claim 1, wherein the handle extends through the seal assembly.

3. The method of claim 2, wherein the handle moves laterally within the tube and the lateral movement of the handle is independent of the tube.

4. The method of claim 3, wherein the handle moves rotationally within the tube and the rotational movement of the handle is independent of the tube.

5. The method of claim 1, wherein the chuck interface is coupled to a face seal within the seal assembly.

* * * * *

UNITED STATES PATENT AND TRADEMARK OFFICE
CERTIFICATE OF CORRECTION

| | | |
|---|---|---|
| PATENT NO. | : 11,513,293 B2 | Page 1 of 1 |
| APPLICATION NO. | : 16/777226 | |
| DATED | : November 29, 2022 | |
| INVENTOR(S) | : Erling Richard Anderson et al. | |

It is certified that error appears in the above-identified patent and that said Letters Patent is hereby corrected as shown below:

In the Specification

In Column 1, Line 7, delete "10,591,647," and insert -- 10,591,674, --.

In the Claims

In Column 9, Line 9, Claim 1, delete "furnace" and insert -- furnace, --.

Signed and Sealed this
First Day of August, 2023

Katherine Kelly Vidal
*Director of the United States Patent and Trademark Office*